United States Patent Office 3,522,606
Patented Aug. 4, 1970

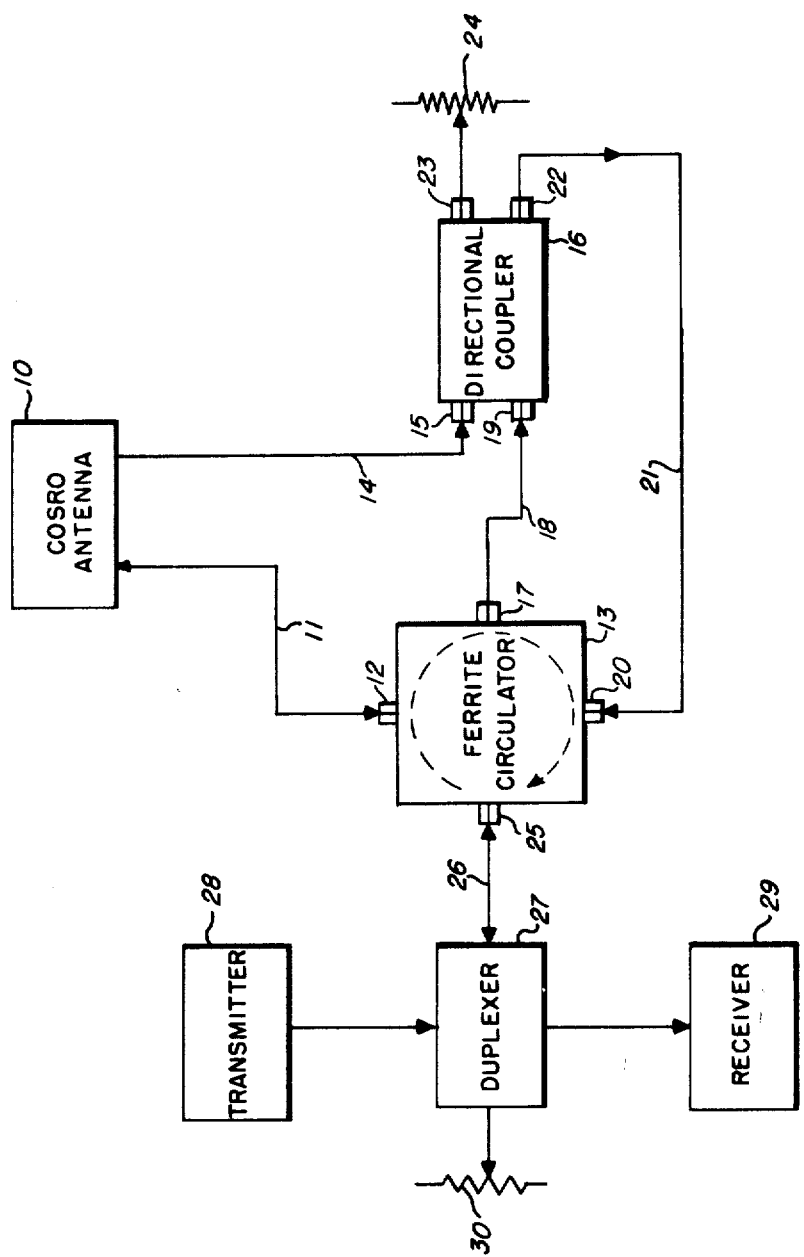

3,522,606
COUPLING CIRCUITS FOR SCANNING
ANTENNAS AND THE LIKE
Max Michelson, Framingham, Mass., assignor to Raytheon Company, Lexington, Mass., a corporation of Delaware
Filed June 15, 1960, Ser. No. 36,211
Int. Cl. H01q 3/26; G01s 3/56
U.S. Cl. 343—100                    12 Claims

ABSTRACT OF THE DISCLOSURE

A coupling circuit for COSRO antennas is provided wherein electromagnetic energy is transmitted in a conventional manner and a conical scan is obtained on receive only. Energy to be transmitted passes through a ferrite circulator and the reference arm of the antenna. Received energy passes through the circulator from the reference arm and is combined in a directional coupler with received energy from the difference arms of the antenna. The output of the directional coupler is coupled back to the circulator and passes to the receiver through a duplexer.

---

The present invention relates to coupling circuits for scanning antennas and the like and more particularly to coupling circuits for conical scanning antennas wherein electromagnetic wave energy is transmitted in conventional manner and conical scan on receive only (COSRO) is utilized.

It is often convenient to have an antenna system in which the radiation is lobed, the axis of the lobe being at an angle to an axis about which the lobe rotates. Such scanning systems are sometimes termed "conical" scanning systems because the lobe axis describes a cone in its revolution about the axis of revolution. Such a conical scanning system is used, for example, in conventional conical scanning radar sets. Conical scanning may be obtained in a number of well known and different ways. For example, in some scanners the scanning action is secured by the motion of a member which changes the phase velocity of energy passing through a waveguide, the waveguide is coupled to a plurality of antenna elements. As the phase velocity is changed, the radiated energy scans a sector of space. Of course, the energy pattern of the antenna also scans for received energy. The operation of these scanners and the correlation of the scanning action by suitable apparatus connecting the waveguide and the moving member to the remainder of the radar apparatus is well known and understood in the art. In other scanners the entire antenna is moved in a predetermined manner to provide the scanning action for transmission and again the energy pattern of the antenna also scans for received energy. However, all such systems are subject to detection by the illuminated target by reason of the fact that a modulation frequency is present because of the conical scanning action, and hence, suitable countermeasures can be used to provide erroneous tracking information. As a result thereof still other scanning systems are well known and understood in the art wherein electromagnetic wave energy is radiated in conventional manner, which is to say conical scanning on transmission is not used, but conical scanning on receive only is used by varying the energy pattern of the antenna for received energy. Briefly, this may be accomplished, for example, by a separate transmitting antenna and a COSRO receiving antenna or, alternately, a single antenna having a reference arm for transmission and a difference arm or arms wherein the energy pattern is varied to provide COSRO. The latter scanning action may be accomplished, for example, by variation in conventional manner of the phase velocity of the received signals. However, prior art COSRO systems are subject to certain limitations and disadvantages. For example, the transmitted signal must be coupled to the reference or transmitting arm only and for tracking information it is necessary that received signals on the reference arm be combined in a particular manner with received signals on the difference or COSRO arms.

In one known embodiment, heretofore it has been customary to use TR tubes to prevent energy from being radiated on the difference arms. The reliability of TR tubes is not entirely satisfactory and COSRO systems utilizing TR tubes usually require some sort of indicating circuit to detect tube failure. Also, a non-directional power splitter has to be used with a TR tube which results in variations of the power split ratio with variations in VSWR of the antenna arms and non-uniform cross-over values throughout the frequency band of interest. Poor or late firing of the TR tube is a problem and misfiring of the TR tube results in noise being introduced into the receiver of the tracking system. Still further, nearby radars operating in the same frequency band can fire the TR tube, thus preventing the radar from obtaining any tracking information.

Accordingly, it is the principle object of the present invention to provide a particularly simple and desirable coupling circuit.

It is another object of the present invention to provide an improved means for coupling systems for COSRO antennas.

It is a further object of the present invention to provide a coupling system for COSRO antennas having none of the disadvantages pointed out hereinabove.

In accordance with the present invention as applied to radar apparatus utilizing a COSRO antenna, energy from the transmitter is coupled to one port of a ferrite circulator. The energy entering this port emerges at a second port which is connected to a reference arm of a COSRO antenna and the energy is radiated without conical scan. Received energy in the reference arm is, of course, coupled to the last mentioned or second port of the ferrite circulator and emerges at a third port and is combined in a directional coupler with received energy from the difference arms of the COSRO antenna. The coupling of the directional coupler is selected to give the desired cross-over value of the COSRO system. The received energy combined in the directional coupler is coupled to the fourth port of the ferrite circulator and consequently emerges at the first port thereof and is thereafter coupled to the radar receiver or tracking system in conventional manner.

The foregoing and other objects, advantages and novel features of the present invention will be more apparent from the following description when taken in connection with the accompanying drawing which is a block diagram of an antenna system embodying the invention.

Referring now to the single figure of the drawing, the reference arm of the COSRO antenna 10 is coupled by way of waveguide 11 to one port 12 of a conventional ferrite circulator network 13 and the difference arm or arms of the COSRO antenna 10 are coupled by way of waveguide 14 to one port 15 of a conventional directional coupler 16. Circulators are now so well known that only a brief discussion thereof is deemed necessary. These networks are generally designated "circulator circuits" and have electrical properties such that electrical energy incident in one branch thereof is coupled to only one other branch for a given direction of transmission, but to another branch for the opposite direction of transmission. Stating it another way, a circulator is a nonreciprocal electrical component having at least three ports. It has the property that energy incident on a first port is coupled to a second port of the circulator; and energy incident on a second port is coupled to a third port. This is contrary to the expected operation of a reciprocal electrical component in which energy applied to the second port is coupled back to the first port. As suggested by the name "circulator" energy incident on the third port of the unit is coupled to the next successive port of the circulator and finally, energy incident on the last port of the circulator is coupled to the first port. By way of example, two forms of circulators which use the Faraday effect in nonconducting ferrites to obtain the required nonreciprocity are shown in FIGS. 12–14 of an article by C. L. Hogan entitled "The Ferromagnetic Faraday Effect at Microwave Frequencies" which appeared at pages 253 through 263 of Reviews of Modern Physics, January 1953, volume 25, No. 1. A circulator of the Faraday effect type is also mentioned by N. G. Sakiotis and H. N. Chait at page 93 of their article entitled "Ferrites at Microwaves" which appeared at pages 87–93 of the January 1953 issue of the Proceedings of the IRE. Circulators have also been constructed which use directional couplers and ferrite material in parallel rectangular guides.

Directional couplers are known in the electrical transmission art as a means for extracting into a branch or auxiliary path considerable energy from a wave traveling in a given direction in a main transmission line or waveguide, but no energy, or very little, from a wave traveling therein in the opposite or "reverse" direction. From reciprocity considerations, it can be seen that such devices when excited in the branch path, can be made to couple energy to the main line in the forward direction, while substantially no energy will be coupled to the main line in the reverse direction. The ratio of the backward-to-forward loss is designated the directivity coefficient of the coupler.

Directional couplers can be classified into two (or three) types according to how the directional property arises. In one basic type, the coupling of each element is bidirectional, but in one direction the elementary induced waves cancel by destructive interference while in the other direction they add. This can be termed an interference-type directional coupler. In the other basic type, the coupling of each element is inherently directional, and no interference between waves from separate coupling elements is necessary for directional characteristics. This can be termed an intrinsic-type directional coupler. Additionally, an arrangement is possible which utilizes both inherently directional coupling elements as well as interference cancellation. This can be termed a composite-type directional coupler.

A second port 17 of the ferrite circulator 13 is coupled by way of waveguide 18 to a second port 19 of the directional coupler 16. A third port 20 of the ferrite circulator 13 is coupled by way of waveguide 21 to a third port 22 of the directional coupler 16, the fourth port 23 of the directional coupler being terminated in a non-reflective load 24. The fourth port 25 of the ferrite circulator 13 is coupled by way of waveguide 26 to a conventional duplexer 27 which in conventional manner supplies energy from the transmitter 28 to waveguide 26 and received energy in waveguide 26 to the receiver 29. As is conventional the fourth port of the duplexer 27 is terminated in a non-reflective load 30. The various ports of the ferrite circulator 13 are selected such that energy to be transmitted in waveguide 26 supplied from the transmitter 28 is coupled to waveguide 11; received energy from the reference arm of the COSRO antenna 10 in waveguide 11 is coupled to port 17; and energy traveling toward port 20 is coupled to port 25. The various ports of the directional coupler 16 are selected in conventional manner such that received energy from the difference arms of the COSRO antenna 10 in waveguide 14 traveling toward the first port 15 is coupled to the third port 22 in the desired proportion such as 1:2, for example, and received energy traveling toward the second port 19 of the directional coupler is also coupled to the third port 22 of the directional coupler.

It may now be evident that in operation energy from the transmitter 28 is propagated through the duplexer 27 and waveguide 26 into port 25 of the ferrite circular 13. The energy entering port 25 emerges at port 12 which is connected to the reference arm of the COSRO antenna 10 by waveguide 11 and is radiated without conical scan. The received energy in the reference arm of the COSRO antenna 10 is coupled back to port 12 of the ferrite circulator and emerges at port 17 where it is coupled to port 19 of the directional coupler 16 by waveguide 18. The received energy from the reference arm of the COSRO antenna enters port 19 and emerges at port 22 of the directional coupler. Energy reflected from a target is also received in the difference arms of the COSRO antenna 10 and is coupled to port 15 of the directional coupler by waveguide 14. Received energy from the difference arms enters port 15 and emerges at port 22. The directional coupler 16 combines the received energy from the reference and difference arms of the COSRO antenna in port 22 in the designated proportion to give the desired cross-over value of the COSRO system. The combined received energy in port 22 of the directional coupler is coupled to port 20 of the ferrite circulator by waveguide 21. The combined received energy entering port 20 emerges at port 25 of the ferrite circulator and is coupled to the receiver and/or tracking system 29 through waveguide 26 and duplexer 27.

In all cases, it is to be understood that the above-described arrangement is simply illustrative of one embodiment of many possible specific embodiments which can represent applications of the principles of the invention. Numerous and other varied arrangements can readily be devised in accordance with said principles by those skilled in the art without departing from the spirit and scope of the invention.

What is claimed is:

1. In an antenna coupling system the combination comprising: a plurality of antenna elements; a four port circulator having a first port connected to one of said antenna elements; a common transmission line coupled to a second of said circulator ports; a four port directional coupler having a first port connected to another of said antenna elements; first means connecting a third of said circulator ports to a second of said coupler ports; second means connecting the remaining port of said circulator to a third of said coupler ports whereby energy to be transmitted in said common transmission line is coupled to said one antenna element and received energy on all said antenna elements are coupled to said transmission line; and a non-reflective load connected to a fourth port of said coupler.

2. In an antenna coupling system the combination comprising: a plurality of antenna elements; a four port circulator having a first port connected to one of said antenna elements; a common transmission line coupled to a second of said circulator ports; a four port directional coupler having a first port connected to another of said antenna elements; first means connecting a third of said circulator ports to a second of said coupler ports; second means connecting the remaining port of said circulator to a third of said coupler ports whereby energy to be transmitted in said common transmission line is coupled to said one antenna element and received energy on all said antenna elements are combined in said coupler and coupled to said common transmission line; and a non-reflective load connected to a fourth port of said coupler.

3. In an antenna coupling system the combination comprising: a plurality of antenna elements; a four port circulator having a first port connected to one of said antenna elements; a common transmission line coupled to a second of said circulator ports; a four port directional coupler having a first port connected to another of said antenna elements; first means connecting a third of said circulator ports to a second of said coupler ports; second means connecting the remaining port of said circulator to a third of said coupler ports whereby energy to be transmitted in said common transmission line is coupled to said one antenna element and received energy on all said antenna elements are combined in said coupler and thereafter coupled to said common transmission line; and a non-reflective load connected to a fourth port of said coupler through said circulator.

4. In an antenna coupling system the combination comprising: a plurality of antenna elements; a four port circulator having a first port connected to one of said antenna elements; a common transmission line coupled to a second of said circulator ports; a four port directional coupler having a first port connected to another of said antenna elements; first means connecting a third of said circulator ports to a second of said coupler ports; second means connecting the remaining port of said circulator to a third of said coupler ports, energy to be transmitted in said common transmission line being coupled to said one antenna element only and received energy on said one antenna element being coupled through said first means to said coupler, received energy on said other antenna element being combined in said coupler with received energy on said antenna element and coupled energy on said one antenna element to said common transmission line; and a non-reflective load connected to a fourth port of said coupler through said second means and said circulator.

5. In an antenna coupling system the combination comprising: a plurality of antenna elements; a four port circulator having a first port connected to one of said antenna elements; a common transmission line coupled to a second of said circulator ports; a four port directional coupler having a first port connected to another of said antenna elements; first means connecting a third of said circulator ports to a second of said coupler ports; second means connecting the remaining port of said circulator to a third of said coupler ports, energy to be transmitted in said common transmission line being coupled to said one antenna element only and received energy on said one antenna element being coupled through said first means to said coupler, received energy on said other antenna element being combined in a predetermined ratio in said coupler with received energy on said one antenna element and coupled to said common transmission line; and a non-reflective load connected a fourth port of said coupler through said second means and said circulator.

6. In an antenna coupling system the combination comprising: an antenna having a reference arm and a difference arm; a four port circulator having a first port coupled to said antenna reference arm; a common transmission line coupled to a second of said circulator ports; a four port directional coupler having a first port connected to said antenna difference arm; first means coupling a third of said circulator ports to a second of said coupler ports; and second means coupling the remaining port of said circulator to a third port of said coupler whereby energy in said common transmission line propagated toward said circulator is coupled to said reference arm and received energy on both said arms are combined and coupled to said common transmission line; and a non-reflective load connected to the remaining port of said coupler.

7. In an antenna coupling system the combination comprising: an antenna having a reference arm and a difference arm; a four port circulator having a first port coupled to said antenna reference arm; a common transmission line coupled to a second of said circulator ports; a four port directional coupler having a first port connected to said antenna difference arm; first means coupling a third of said circulator ports to a second of said coupler ports; and second means coupling the remaining port of said circulator to a third port of said coupler whereby energy in said common transmission line propagated toward said circulator is coupled to said reference arm and received energy on both said arms are combined in said coupler and coupled to said common transmission line; and a non-reflective load connected to the remaining port of said coupler.

8. In an antenna coupling system the combination comprising: an antenna having a reference arm and a difference arm; a four port circulator having a first port coupled to said antenna reference arm; a common transmission line coupled to a second of said circulator ports; a four port directional coupler having a first port connected to said antenna difference arm; first means coupling a third of said circulator ports to a second of said coupler ports; and second means coupling the remaining port of said circulator to a third port of said coupler whereby energy in said common transmission line propagated toward said circulator is coupled to said reference arm and received energy on both said arms are combined in said coupler in a predetermined ratio and coupled to said common transmission line through said second means and said circulator; and a non-reflective load connected to the remaining port of said coupler.

9. In an antenna coupling system the combination comprising: an antenna having a reference arm and a difference arm; a four port circulator having a first port coupled to said antenna reference arm; a common transmission line coupled to a second of said circulator ports; a four port directional coupler having a first port connected to said antenna difference arm; first means coupling a third of said circulator ports to a second of said coupler ports; and second means coupling the remaining port of said circulator to a third port of said coupler, energy in said common transmission line propagated toward said circulator being coupled to said reference arm only and received energy on both arms being combined in said coupler in a predetermined ratio and thereafter coupled to said common transmission line by said second means and said circulator; and a non-reflective load connected to the remaining port of said coupler.

10. In an antenna coupling system the combination comprising: an antenna having a reference arm for radiating and receiving electromagnetic energy and a difference arm for conically scanning received energy only; a four port circulator having a first port coupled to said antenna reference arm; a common transmission line coupled to a second of said circulator ports; a four port directional coupler having a first port connected to said antenna difference arm; first means coupling a third of said circulator ports to a second of said coupler ports; a non-reflective load terminating one of said coupler ports; and second means coupling the remaining port of said circulator to the remaining port of said coupler, energy in said common transmission line propagated toward said circulator being coupled to said reference arm only and received energy on said reference arms being coupled by said circulator and said first means to said coupler, received energy on said difference arm being combined in said coupler in a predetermined ratio with received energy on said reference arm, and said combined received energy being coupled to said common transmission line by said second means and said circulator.

11. In an antenna coupling system the combination comprising: an antenna having a difference arm for conically scanning received electromagnetic energy and a reference arm for radiating and receiving electromagnetic energy without conical scan; a ferrite circulator having a first, second, third and fourth port wherein energy received by any one port is coupled to the next succeeding port, said first port being coupled to said antenna reference arm; a common transmission line connected to said fourth port; a directional power coupler having a first, second, third and fourth port wherein energy incident on said first and fourth ports of said coupler are coupled in a predetermined ratio to said third port of said coupler, said first port of said coupler being connected to said difference arm; a first transmission line coupling said second port of said circulator and said fourth port of said coupler; a second transmission line coupling said third port of said circulator and said third port of said coupler; and a non-reflective load terminating said second port of said coupler.

12. In combination, a coupling system comprising an antenna having a plurality of antenna elements; a first coupling unit having a first plurality of ports; a second coupling unit having a second plurality of ports; a first port of said first unit connected to one of said antenna elements; a first port of said second unit connected to another of said antenna elements; a second port of said first unit connected to a second port of said second unit; a third port of said first unit connected to a third port of said second unit; and a transmission line connected to a fourth port of said first unit.

References Cited

UNITED STATES PATENTS

| | | | |
|---|---|---|---|
| 2,619,635 | 11/1952 | Chait | 343—16 |
| 2,976,497 | 3/1961 | Watts | 333—22 |

RODNEY D. BENNETT, Primary Examiner

R. E. BERGER, Assistant Examiner

U.S. Cl. X.R.

343—16, 180, 854, 858